United States Patent Office 3,535,278
Patented Oct. 20, 1970

3,535,278
POLYMERS CONTAINING ALPHA-AMINO-ALKANE-PHOSPHORYL GROUPS IN A CHAIN
Günter Oertel, Cologne-Flittard, and Hans-Georg Schmelzer, Cologne-Stammheim, Germany, assignors to Farbenfabriken Bayer Aktiengesellschaft, Leverkusen, Germany, a corporation of Germany
No Drawing. Filed July 20, 1966, Ser. No. 566,484
Claims priority, application Germany, July 22, 1965,
F 46,676, F 46,677
Int. Cl. C08g 45/04
U.S. Cl. 260—47                 9 Claims

ABSTRACT OF THE DISCLOSURE

Polyaddition compounds prepared by a process which comprises reacting a compound having a plurality of

groups with a compound having a plurality of azomethine groups.

---

This invention relates to polymers and a new polyaddition process for the preparation of polymers containing phosphorus and nitrogen in a chain.

It is known that a phosphite will add across the double bond of a Schiff's base. Heretofore, however, this reaction has only been employed in the preparation of monomers.

It is, therefore, an object of this invention to provide polymers containing nitrogen and phosphorus in a chain and a new process for the preparation thereof. Furthermore, it is an object of this invention to provide for the preparation of polymers which have improved temperature stability and which may be foams, films, foils, coatings, elastomers or the like. Another object of this invention is to provide a method of preparing improved polymers by reacting certain phosphorus containing compounds with certain nitrogen containing compounds of the phosphite and Schiff's base type. Another object of this invention is to provide thermoplastic polymers having improved heat resistance and cross-linked products based on said thermoplastic polymers. A further object of this invention is to provide compression moldings and the like based on polymers prepared by a new polyaddition reaction.

The foregoing objects and others are accomplished in accordance with the invention, generally speaking, by providing polyaddition compounds prepared by a process wherein a compound having a plurality of

groups is reacted with a compound having a plurality of azomethine groups preferably at a temperature of from about —20° C. to about 250° C. Thus, this invention contemplates polyaddition compounds prepared by reacting compounds which have a plurality of

groups, the

groups being linked together by, for example, hydrocarbons, polyethers, polythioethers, polyesters, polycarbonates, polyamides, silicones, furan resins, polysulphides, epoxides, polyacetals, aniline-formaldehyde resins, melamine-formaldehyde resins, phenol-formaldehyde resins or any of a wide variety of organic residues or simple organic divalent or higher polyvalent radicals with a compound containing a plurality of azomethine groups, i.e. groups having a —HC=N— radical and particularly compounds which are Schiff's bases which are prepared by the addition of an aldehyde or a ketone to a primary polyamine. Thus, this invention proposes a new polyaddition reaction wherein the compounds containing a plurality of

groups are reacted with compounds which contain a plurality of the azomethine groups. In accordance with a preferred embodiment of the invention one of the invention one of the reactants is of relatively low molecular weight while the other reactant is of relatively high molecular weight so that chain extension of the desired component takes place. For example, it is preferred to have either the compound containing a plurality of

groups or the compound containing azomethine groups to be of high molecular weight and the other component of the reaction mixture to be of low molecular weight, then the low molecular weight component can more readily react at the reactive sites on the opposite component to prepare high molecular weight compounds.

It is not possible to illustrate all of the compounds which can be prepared in accordance with this invention by formula. Only the very simplest compounds can be illustrated but such an illustration may serve to better demonstrate the process of the invention. Using difunctional components in the following scheme, wherein R is a monovalent organic radical and R' and R" are divalent organic radicals, it is possible to see how the polyaddition reaction can take place to form a linear polymer.

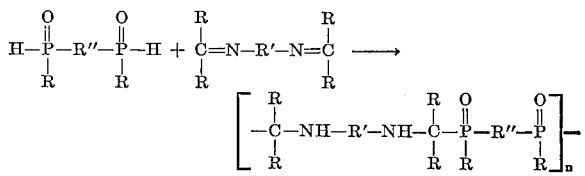

However, the foregoing reaction scheme is only an illustration. In the product which is obtained from stoichiometric amounts of divalent components, n will be a higher integer. On the other hand, more or less of one of the reactants can be used, and in this case the n will be a lower integer and the linear chain will be terminated in the type of radical which was employed in excess, As pointed out above, any suitable compound containing the grouping

at least twice in the molecule may be used as one of the reactants.

Of these compounds there may be mentioned in the first place those which contain two or more dialkylphosphite groups in the molecule. The free valences of the phosphorus atoms in the above formula are attached directly to or via oxygen or nitrogen atoms to carbon atoms. Illustrative and specific preparations of these compounds will be more fully set forth below. Generally speaking, however, the nature of the residues attached to the above free valences is of any desired kind under the above-mentioned provision. Practically, these compounds belong to the classes of phosphorous acid diesters, phosphorous acid diamides, phosphorous acid monoester monomides, phosphonous acid esters, phosphonous acid amides, secondary phosphine oxides. They all can be prepared exactly in the way very well-known in the art for these compounds having one of the $$-\overset{O}{\underset{H}{P}}-$$

groups. The preferred compounds with dialkyphosphite groups can be prepared by condensation of monomeric dialkylphosphites, et.g. dimethylphosphite with polyols. Compounds which have the necessary plurality of $$-\overset{O}{\underset{H}{P}}-$$

groups include both low molecular weight and high molecular weight compounds, of which the following are given as examples.

1.  
$$H-\overset{O}{\underset{OCH_3}{P}}-O-CH_2-CH_2-O-\overset{O}{\underset{OCH_3}{P}}-H$$

2.  
$$H-\overset{O}{\underset{OC_2H_5}{P}}-O-(CH_2)_6-O-\overset{O}{\underset{OC_3H_5}{P}}-H$$

3.  
$$H-\overset{O}{\underset{OC_8H_{17}}{P}}-O-(CH_2)_{10}-O-\overset{O}{\underset{OC_8H_{17}}{P}}-H$$

4.  
$$H-\overset{O}{\underset{OCH_2CH_2Cl}{P}}-O-[CH_2CH_2-O]_n-\overset{O}{\underset{OCH_2CH_2Cl}{P}}-H$$

$n$ in the foregoing formula may be 1 to 100

5.  
$$H-\overset{O}{\underset{\underset{CH_3}{OCH-CH_2Cl}}{P}}-O-[(CH_2)-O]_n-\overset{O}{\underset{\underset{CH_3}{OCH-CH_2Cl}}{P}}-H$$

6.  
$$H-\overset{O}{\underset{OC_2H_5}{P}}-O-CH_2-\underset{\underset{CH_3}{CH_3}}{\overset{CH_3}{C}}-CH_2-O-\overset{O}{\underset{OC_2H_5}{P}}-H$$

7.  
$$H-\overset{O}{\underset{OC_3H_7}{P}}-O-CH_2CH_2-\underset{CH_3}{N}-CH_2CH_2-O-\overset{O}{\underset{OC_3H_7}{P}}-H$$

8.  
$$H-\left[\overset{O}{\underset{OCH_2CH_2Cl}{P}}-O-CH_2\right]_3-O-C_2H_5$$

9.  
$$H-\overset{O}{\underset{OC_2H_5}{P}}-O-(CH_2)_6-O-\overset{O}{\underset{H}{P}}-O-(CH_2)_6-O-\overset{O}{\underset{OC_2H_5}{P}}-H$$

10.  
$$H-P\underset{O}{\overset{O}{<}}\underset{O}{\overset{O}{>}}\underset{O}{\overset{O}{<}}P-H$$

11.  
$$H-O-CH_2CH_2-OOC-R-COO-CH_2CH_2-\left[-O-\overset{O}{\underset{H}{P}}-O-CH_2CH_2-OOC-R-COO-CH_2CH_2-\right]_n-O-\overset{O}{\underset{OC_2H_5}{P}}-H$$

R in the foregoing formula may be phenylene ring; $-(CH_2)_2$; $-CH=CH-$; or $-(CH_2)_4-$ and the like and $n$ may be 1–50

12.  
$$H-\overset{O}{\underset{OC_4C_9}{P}}-O-\left[CH-CH-O\underset{R'}{\underset{R}{\phantom{x}}}\right]_n-\overset{O}{\underset{OC_4H_9}{P}}-H$$

13.  
$$\underset{\underset{O}{\phantom{x}}}{CH_2}-\underset{\underset{O}{\phantom{x}}}{CH}-\underset{\underset{O}{\phantom{x}}}{CH}-\underset{\underset{O}{\phantom{x}}}{CH}-\underset{\underset{O}{\phantom{x}}}{CH}-\underset{\underset{O}{\phantom{x}}}{CH_2}$$
with three P(=O)H groups bridging 14.  
$$N(CH_2-CH_2-O-\overset{O}{\underset{OCH_3}{P}}-H)_3$$

15.  
$$H-\overset{O}{\underset{OC_2H_5}{P}}-O-CH_2CH_2-S-CH_2CH_2-O-\overset{O}{\underset{OC_2H_5}{P}}-H$$

16.  
$$\underset{\underset{O}{\phantom{x}}}{CH_2}-\underset{\underset{O}{\phantom{x}}}{CH}-CH_2-O-\overset{O}{\underset{OCH_3}{P}}-H$$
with cyclic P 17.  
$$H-P\underset{O-CH_2CH_2-O}{\overset{O-CH_2CH_2-O}{<}}P-H$$

18.  
$$H-P\underset{O-CH_2}{\overset{O-CH_2}{<}}\underset{CH_2}{\overset{C_2H_5}{C}}-CH_2-O-\overset{O}{\underset{OC_4H_9}{P}}-H$$

19.  
$$H-(CH_2)_6-O-\overset{O}{\underset{H}{P}}-O-(CH_2)_6-O-\overset{O}{\underset{H}{P}}-O-(CH_2)_6-OH$$

20.  
$$HO-(CH_2)_6-O-\left[\overset{O}{\underset{H}{P}}-O-(CH_2)_6-O-\right]_n-H$$

21.  
$$HO-CH_2CH_2-O-\text{\textlangle phenyl\textrangle}-O-CH_2CH_2-O-\left[\overset{O}{\underset{H}{P}}-O-CH_2CH_2-O-\text{\textlangle phenyl\textrangle}-O-CH_2CH_2-O-\right]_n-H$$

$n$ in the foregoing formula may be 1 to 50

22.  
$$HO-CH_2CH_2-\underset{CH_3}{N}-CH_2CH_2-O-\left[\overset{O}{\underset{H}{P}}-O-CH_2CH_2-\underset{CH_3}{N}-CH_2CH_2-O-\right]_n-H$$

23.  
$$HO-CH_2CH_2-S-CH_2CH_2-O-\left[\overset{O}{\underset{H}{P}}-O-CH_2CH_2-S-CH_2CH_2-O-\right]_n-H$$

In the above formulas for compounds 20 through 23, n denotes an integer from 2 to 100.

These and other polydialkylphosphites suitable as starting materials may generally be defined by reference to their simplest method of preparation as condensation products of lower dialkyl or diarylphosphites and polyalcohols, the term polyalcohol being understood in this context to mean low or high molecular weight polyhydroxyl compounds such as ethylene glycol, propylene glycol, 1,4-butane-diol, 1,6-hexanediol, hexanetriol, glycerol, pentaerythritol, mannitol, glucose, triethanolamine, thiodiglycol, diethylene glycol, pentaethylene glycol, tripropylene glycol, 2,2-dimethylpropanediol, cyclohexane-1,4-diol, dihydroxyethoxybutane, hydroquinone-di-beta-hydroxyethylether and hydroxyalkylation products of primary or secondary polyamines, e.g., ethylene diamine, diethylene triamine, hexamethylene diamine or 2,4-toluylene diamine, reacted with ethylene oxide, propylene oxide, butylene oxide and the like as well as the higher molecular weight hydroxyalkylation products of polyhydric alcohols such as glycerol or trimethylolpropane. In addition, the polycondensation products of lower dialkyl or diarylphosphites and hydroxyalkylamides of polybasic acids, e.g. terephthalic acid di - beta - hydroxyalkylamides, di - beta-hydroxypropyl-urea or phosphoric acid tri-beta hydroxyethylamide are also suitable.

Also to be mentioned are the polycondensation products, containing dialkylphosphite groups, of lower dialkyl or diaryl phosphites and high molecular weight polyhydroxy compounds.

In this connection, the term high molecular weight polyhydroxyl compounds is to be understood to include in general compounds having molecular weights of 800 to 100,000 and containing terminal hydroxyl groups. Such high molecular weight polyhydroxyl compounds are, for example, polyesters of aliphatic and aromatic carboxylic acids such as adipic acid, sebacic acid, maleic acid, succinic acid, phthalic acid, terephthalic acid, 1,3,5-benzene tricarboxylic acid and the like and polyhydric alcohols such as ethylene glycol, 1,4-butane diol, 1,3-propane diol, trimethylolpropane, glycerine, 1,2,6-hexane triol and the like, polyesters modified with fatty acids ("oil alkyds") and naturally occurring unsaturated polyesters such as castor oil and their degradation products or ester interchange products with polyols; polyesters of carbonic acid; polyesters of phosphorus acid, of phosphoric acid and of phosphonic acid; polyesters of silicic acid, e.g. from dimethyldichlorosilane, water and/or polyfunctional alcohols; polyethers of alkylene oxides such as ethylene and propylene oxide, from trimethylene oxide or tetrahydrofuran, from 1,6-hexanediol, decamethylene glycol, thiodiglycol or from hydroxyalkylated phenols, basic polyethers from di-(beta-hydroxypropyl)-methylamine or dihydroxyethylaniline; polyacetals from formaldehyde and diols such as 1,4-butane diol or 1,6-hexanediol, polyoxymethylenes, e.g. copolymers of formaldehyde or trioxane with 1,3-dioxolane, 1,3-oxothiolane or ethylene oxide; naturally occurring polyacetals such as cane sugar, invert sugar, starch, dextrins, cellulose and their alkylation, acylation, ester interchange and degradation products as well as spirocyclic polyacetals from pentaerythritol and glyoxal; polyepoxyresins, e.g. the higher molecular weight resins which contain secondary hydroxyl groups and are based on bis-(2,3-epoxypropylether) of 1,4-butanediol or diphenylolpropane or of bis-(2,3-epoxypropyl)-aniline and their derivatives modified with unsaturated carboxylic acids, natural resinic acids or with phenol, melamine or urea formaldehyde resins. In addition, there may be mentioned polymers containing hydroxyl groups, e.g. homo or copolymers of unsaturated compounds which contain hydroxyl groups, such as hydroxyalkylesters or hydroxyalkylamides of acrylic acid, hydroxyalkylstyrenes, allyl alcohol, maleic acid hydroxyalkyl esters, partially saponified polyvinyl acetate, partially saponified polyvinylidene carbonates and other polymers.

Other suitable starting materials for the process according to the invention are compounds which contain two or more diarylphosphite or aryl-alkyl-phosphite groups in the molecule, such as

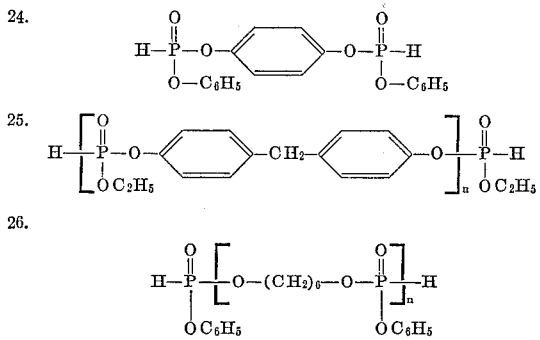

In the foregoing Formulas 25 and 26 n may be 1 to 50. Also, compounds which contain, in one and the same molecule, dialkylphosphite, diarylphosphite and/or alkylarylphosphite groups, such as, for example, the following:

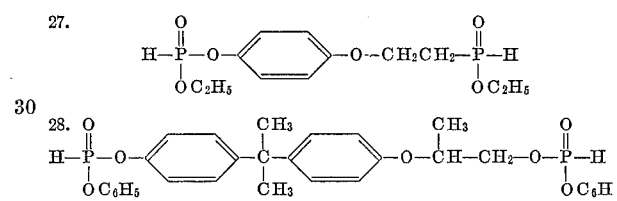

The condensation products of lower dialkylphosphites or diphenylphosphite and polyesters, containing phenolic hydroxyl groups, of polyphenols and polycarboxylic acids as well as phenolformaldehyde resins, for example a novolak having an average of 4 phenol groups per molecule, may also be mentioned in this connection.

Other suitable starting materials which may be used according to the invention, which contain the grouping

at least twice, are, in addition to the above-mentioned substances containing dialkyl, diaryl, or aryl-alkylphosphite groups, compounds which contain two or more phosphorous acid diamide, phosphorous acid monoester monoamide, phosphorous acid monoamide or phosphonous acid monoester groups or secondary phosphine oxide groups in the molecule, e.g. the following:

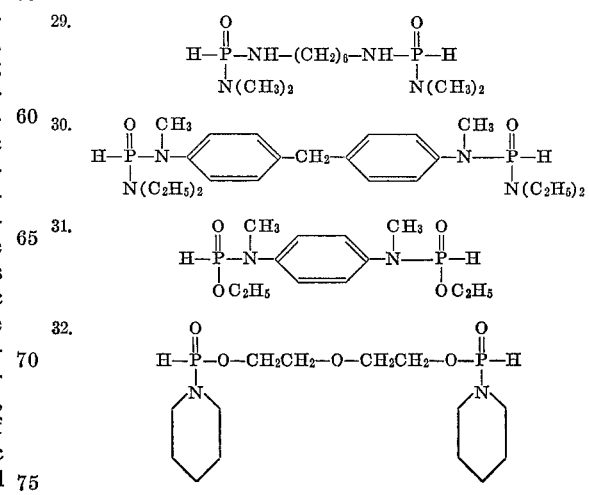

33.  
$$\text{H}-\overset{\text{O}}{\underset{\text{C}_2\text{H}_5}{\overset{\|}{\text{P}}}}-\text{NH}-(\text{CH}_2)_6-\text{NH}-\overset{\text{O}}{\underset{\text{C}_2\text{H}_5}{\overset{\|}{\text{P}}}}-\text{H}$$

34.  
$$\text{H}-\overset{\text{O}}{\underset{\text{CH}_3}{\overset{\|}{\text{P}}}}-\text{O}-(\text{CH}_2)_4-\text{O}-\overset{\text{O}}{\underset{\text{CH}_3}{\overset{\|}{\text{P}}}}-\text{H}$$

35.  
$$\text{N}(\text{CH}_2\text{CH}_2-\overset{\text{O}}{\underset{\text{CH}_2}{\overset{\|}{\text{P}}}}-\text{H})_3$$

36.  
$$\text{H}-\overset{\text{O}}{\underset{\text{C}}{\overset{\|}{\text{P}}}}-\text{CH}_2\text{CH}_2\text{CH}_2\text{CH}_2-\overset{\text{O}}{\underset{\text{C}_2\text{H}_5}{\overset{\|}{\text{P}}}}-\text{H}$$

37.  
$$\text{H}-\overset{\text{O}}{\underset{\text{CH}_3}{\overset{\|}{\text{P}}}}-\text{CH}_2\text{CH}_2-\overset{\text{O}}{\underset{\text{CH}_3}{\overset{\|}{\text{P}}}}-\text{H}$$

Suitable starting materials containing several phosphorous acid diamide groups or esteramide groups are in addition the condensation products of dialkyl or diarylesters or diamides or phosphorous acid with primary or secondary polyamines or with diamides, containing primary or secondary amide groups, of dicarboxylic acid or disulphonic acid, urea or phosphoric acid di- and tri-amide, as well as suitable condensation products of polycarboxylic acid polyamides having amino or amido end groups, polypeptides, polyimides, polyhydrazides, polysulphonamides, polyureas, aminoplast resins and modification products of phosphorus halides, especially phosphorous nitrochlorides, with amines, polyamines, and amino alcohols.

The polycarbonates may also be used, such as the phosgenation product of 2,2-bis(4,4'-dihydroxydiphenyl) propane which has free —OH groups which has been reacted with a phosphonic acid in order to introduce phosphonic acid groups, or polyamides which have their nitrogen atoms reacted with phosphonic acid in order to introduce groups of the formula

In addition the furane resins, polysulphides, aniline-formaldehype resins, melamine-formaldehyde resins and resinous materials which will react with a phosphonic acid or derivative in order to introduce the grouping

into the molecule at least twice can be used as this component.

Since the only prerequisite for the success of the polyaddition reaction according to the invention is that the one starting component must contain two or more groups of the formula

in the molecule, these groups need not be identical in the type of substitution on the two free valencies of phosphorus. They can be derived from the various classes listed above. Thus, for example, a compound may have one or more dialkyl phosphite groups and one or more diarylphosphite groups or one or more phosphonous acid monoester groups and dialkyl phosphine oxide groups.

It is also possible to use mixtures of several compounds each of which contains two or more groups of the formula

in the molecule.

In accordance with a preferred embodiment of the invention, however, high molecular weight cross-linked polyurethane plastics are produced by reacting linear or branch polyurethanes which have been prepared by the isocyanate polyaddition process from polyols and organic polyisocyanates which have had incorporated into the molecule a plurality of groups of the formula

in which the phosphorus atom is linked to a carbon atom directly or through oxygen or nitrogen atoms are reacted with the compound containing a plurality of azomethine groups. The linear or branched polyurethanes used as starting materials for this preferred embodiment which contain several groups of the formula

in the molecule, are obtained by the reaction of organic polyisocyanates with an organic compound containing active hydrogen containing groups as determined by the Zerewitinoff method and preferably linear or branched condensation and/or polymerization products containing hydroxyl groups. For some products, particularly elastomers it is preferred that the polyols have a molecular weight above about 1000 but for others, particularly the more rigid ones, compounds containing at least two active hydrogen atoms as determined by the Zerewitinoff method and having a molecular weight below 1000 are better. One may also use a plurality of active hydrogen containing compounds in preparing the polyurethanes, some of which are high molecular weight and some low. If the phosphoric acid groups is not present in some other component it may be in either the linear or branched condensation and/or polymerization products containing hydroxyl groups and having a moelcular weight above 1000 or the compound containing at least two hydrogen atoms reactive with isocyanates and having a molecular weight below 1000 or both containing at least one group of the formula

in the molecule.

Where only compounds having a molecular weight above 1000 or only compounds having a molecular weight below 1000 are used for the production of the noncrosslinked polyurethane, the presence of

groups in these compounds is essential. These compounds need only have one

group per molecule since they are prereacted with an organic polyisocyanate to produce a product with a plurality of

groups before further reaction with an azomethine compound.

Suitable linear or branched condensation and/or polymerization products containing hydroxyl groups and having a molecular weight above 1000 and containing at least one group of the formula

in the molecule include, for example, condensation products, containing terminal hydroxyl groups, of lower dialkylphosphites such as dimethyl-, diethyl-, dibutyl- or dihexylphosphite or diphenylphosphate and high molecular weight polyester amides, polyacetals or linear or branched polyesters such as are known to be obtainable by thermal condensation of ethylene glycol, diethylene glycol, propylene glycol, butylene glycol, hexanedoil, hexanetriol, glycerol, trimethylolpropane, pentaerythritol and adipic acid, phthalic acid, terephthalic acid, maleic acid, fumaric acid, glutacomic acid or the like. Also suitable are the corresponding condensation products, containing terminal hydroxyl groups of lower dialkylphosphites of the above mentioned type and polyethers, e.g., ethylene oxide, propylene oxide or tetrahydrofuran polymers or polythioethers, e.g. polythiodiglycol. In addition, one may also use the polycondensation products of lower dialkyl phosphites and low molecular weight polyhydroxy compounds such as ethylene glycol, propylene glycol, 1,4-butanediol, 1,6-hexanediol, 1,2,6-hexanetriol, glycerol, mannitol, diethylene glycol, tripropylene glycol, thiodiglycol, N - methyldiethanolamine, triethanolamine, 2,2-dimethylpropanediol, cyclohexane-1,4-diol, di-beta-hydroxyethoxybutane, 1,5 - naphthylene-di-beta-hydroxyethylether, the di-beta-hydroxyethyl ester of adipic acid, phthalic acid, succinic acid or maleic acid, adipic acid-di-beta-hydroxypropylamide, di - 4 - hydroxybutylurea, these polycondensation products having a molecular weight above 1000 and preferably 1000 to 10,000.

All these condensation products can be obtained simply by heating the low dialkylphosphites with the stated high molecular weight or low molecular weight polyhydroxy compound, the lower alkyl redicals contained in the phosphites being split off in the form of the corresponding alcohols. Some of these polycondensation products are represented by the following formula:

38.

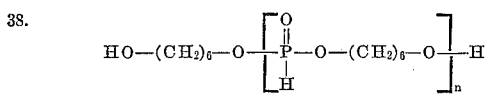

39.

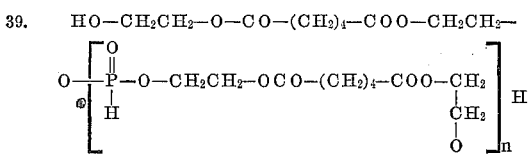

40.

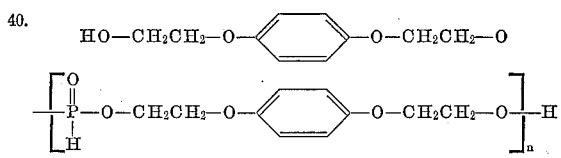

41.

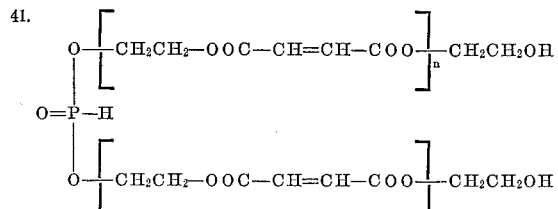

42.

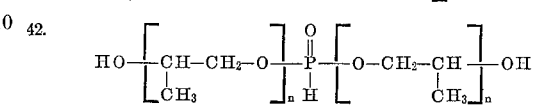

43.

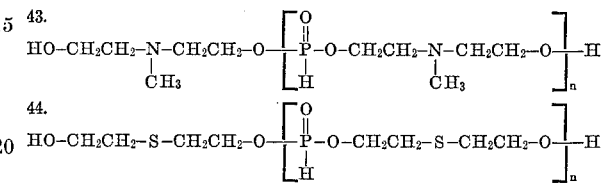

44.

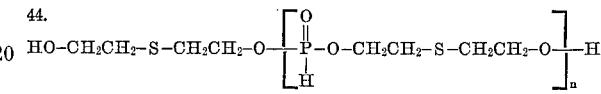

In the foregoing formulas, 38 to 44, $n$ is an integer preferably from 5 to 10.

Suitable compounds containing at least two hydrogen atoms reactive with isocyanates and having a molecular weight below 1000 and containing one or more groups of the formula

in the molecule include for example, the condensation products, containing terminal hydroxyl groups, of lower dialkylphosphites and low molecular weight polyhydroxy compounds of the above mentioned type. In the same way as the corresponding high molecular weight condensation products, they can be prepared by heating the lower dialkyl phosphites with the stated low molecular weight polyhydroxyl compounds, the lower alkyl radicals contained in the phosphites being split off in the form of the corresponding alcohols, and condensation products having a molecular weight below 1000 being obtained by suitable choice of the molar ratios of the reactants. Some of these condensation products correspond to the specific formulas, 38 to 44, specified above in which $n$ in this case represents a number from 1 to 5. Some further examples are represented by the following compounds:

45.

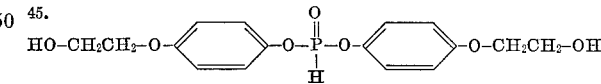

46.

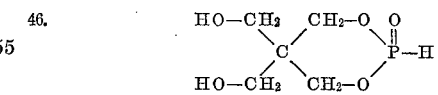

47.

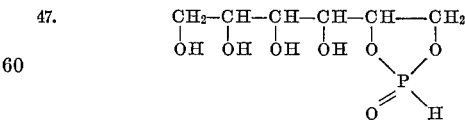

48.

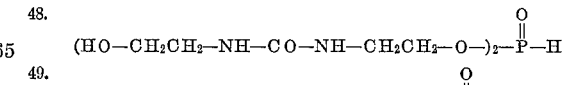

49.

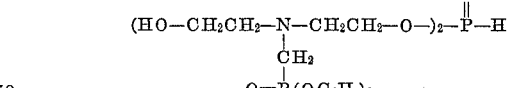

50.

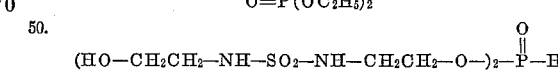

Also to be mentioned in this connection are the lower molecular weight reaction products of phosphorous acid and alkylene oxides, which contain terminal hydroxyl groups.

Condensation products of esters, amides or chlorides of trivalent phosphorus with amino alchols or polyamines, which contain terminal hydroxyl or amino groups, are also suitable. The following are examples of such compounds:

51. 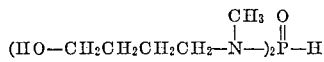

52. 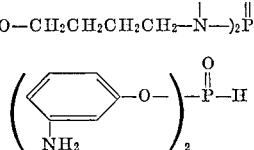

53. 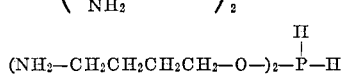

54. 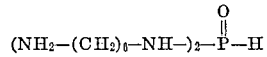

Also to be mentioned are compounds in which the

group is directly linked to a carbon atom, e.g.

55. 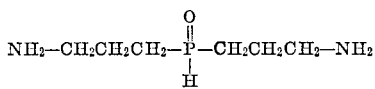

56. 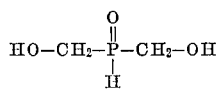

For the preparation of the linear or branched polyurethanes used as starting materials for the process of the invention, which contain in the molecule several groups of the formula

one may use in addition to the above listed linear or branched polyhydroxy compounds containing

groups and having a molecular weight above 1000 and/or the above mentioned compounds containing at least two hydrogen atoms reactive with isocyanates and at least one

group and having a molecular weight below 1000, linear or branched polyhydroxyl compounds having a molecular weight above 1000, such as polyesters, polyethers, polythioethers, polyester amides or polyacetals, and compounds containing at least two hydrogen atoms reactive with isocyanates and having a molecular weight below 1000, such as water, 1,4-butanediol, trimethylolpropane, glycols containing urea, urethane, carbonamide, tertiary amino and ester groups, glycols having aromatic ring systems such as bis-(beta-hydroxyethyl) hydroquinone, o-dichlorobenzidine and 3,3' - dichlorodiaminodiphenylmethane.

For the preparation of the linear or branched, non-cross-linked polyurethanes used as starting materials, one may use any suitable organic polyisocyanates, such as tetramethylene diisocyanate, hexamethylene-diisocyanate and the biuret polyisocyanates well known to be obtainable from hexamethylenediisocyanate by the addition of water as disclosed in U.S. Pat. 3,124,605 issued Mar. 10, 1964, 1,4-cyclohexane dissocyanate, 4,4'-dicyclohexylmethane diisocyanate, o, m and p-xylylenediisocyanate, 1-(3-isocyanate-phenyl)-ethyl isocyanate, toluylene diisocyanates, such as 2,4- or 2,6-toluylene diisocyanate and mixtures thereof particularly 80% 2,4- and 20% 2,6-toluylene diisocyanate, o, m and p-phenylene diisocyanate, 1,5-naphthylenediisocyanate, 4,4'-diphenylmethane diisocyanate and 4,4',4''-triphenylmethane triisocyanate, thiophosphoric acid tri (4-isocyanate-phenylester) as well as polyisocyanates of the above type substituted by a very wide variety of substituents such as alkyl, alkoxy, nitro groups, halogen atoms; in addition, one may also use the reaction products of the above isocyanates with less than equivalent quantities of polyhydroxy compounds such as trimethylolpropane, 1,2,6-hexanetriol, glycerol or 1,4-butane diol, as well as organic polyisocyanates which are masked, for example, with phenols, and polymerized isocyanates having isocyanurate rings such as in U.S. Pat. 2,801,244 issued July 30, 1957.

Any compound which contains at least two azomethine groups in the molecule is suitable for reaction with the above mentioned phosphorus compounds. The term "azomethine" is used in the broad sense to refer to compounds having a C=N bond usually obtained by condensation of an aldehyde or ketone with an amine, in this case, a polyamine. It is only essential that the

group be capable of adding across to C=N bond.

Examples of such compounds are polyfunctional, preferably di- or trifunctional Schiff's bases of monoaldehydes and/or ketones, preferably aldehydes, such as isobutyraldehyde, cyclohexanone, benzaldehyde or substituted benzaldehydes or chloral with polyamines such as tetramethylenediamine, hexamethylenediamine, 4,4'-diaminobutyl ether, 2,2'-diamino-di-n-propyl ether, 3,3'-diaminodipropylsulphone, 1,1,1 - tri(2'-amino-1'-propoxymethyl)-propane, methyl-bis-(3-aminopropyl)-amine, m-phenylenediamine, o - phenylenediamine, p-phenylenediamine, 4,4'-diaminodiphenyl, 4,4'-diaminodiphenyl ether, 4,4'-diaminodiphenylmethane and propane, 4,4'-diaminodiphenylsulphide and sulphone and 4,4',4''-triaminotriphenyl methane and 4,4',4''-triaminotriphenylphosphate or thio-phosphate.

In addition, one may use polyfunctional Schiff's bases of lower primary alkyl and hydroxyalkylamines such as methyl, ethyl, propyl, allyl or butylamine, ethanol or propanolamine or anilines and polyaldehydes such as terephthalic dialdehyde, as well as polyazomethines of polyaldehydes and polyamines of the above mentioned type.

There should also be mentioned resinous compounds having molecular weights of say 2000 to 50,000, containing at least two azomethine groups, e.g. polyurethanes containing azomethine groups, which are obtainable from Schiff's bases with hydroxyl and/or amino groups by reaction with polyisocyanates and/or masked isocyanate, if desired with the addition of polyvalent hydroxyl compounds such as alcohols, polyesters or polyethers. In this case, the polyisocyanates may equally well be monomers or polyesters isocyanates or polyether isocyanates. Examples of Schiff's bases with hydroxyl and/or amino groups are isobutyraldehyde-3-hydroxypropylimine, 4-hydroxycyclohexanone - n - butylimine, 4-hydroxycyclohexanone-3'-hydroxypropyl imine, hydroxypivalic aldehyde-(2-hydroxyethyl and 3 - hydroxy-1-propyl)-imine, alpha,alpha - dimethyl-gamma-hydroxy-butyraldehyde-(2-hydroxyethyl and 3-hydroxy-1-propyl)-imine, 4-hydroxycyclohexanone-(2-hydroxyethyl- and 3-hydroxy-1-propyl)-imine and p-(beta-hydroxyethoxy)-benzaldehyde-(2-hydroxyethyl)- and 3-hydroxyethyl)-imines.

The proportion in which the compound containing a plurality of

groups and the compound containing a plurality of azomethine groups are used in the polyaddition according to the process of the invention is preferably so selected with a view to obtaining high molecular weights, that the groups of the formula

and the azomethine groups are in substantially equivalent amounts. It is possible, however, to use, in the reaction, a subequivalent amount or an excess of azomethine groups based on the

groups present, in which case the resulting molecular weights will, of course, be lower. If an excess of polyazomethines is used, polymers which have azomethine end groups are obtained whereas if a subequivalent amount of polyazomethine is used in the reaction, the polymers contain

end groups.

The use of an excess of one component is particularly to be recommended if the other component contains more than two reactive groups, i.e.

or azomethine groups. Since the polyaddition reaction between a compound which is at least difunctional and a tri- or higher functional compound in equivalent quantities must always lead to cross-linked products, it is possible in such a case to prevent the formation of a cross-linked end product or to regulate the degree of cross-linking by varying the quantitative ratio of the reactants. The process according to the invention thus yields linear, branched or cross-linked polyaddition products, depending on the type and proportion of starting materials.

Instead of the polyazomethines, equivalent mixtures of monoaldehydes or ketones and polyamines, monoamines and polyaldehydes or polyamines and polyaldehydes may be used for the reaction. In that case, the polyazomethine formed reacts in situ with the compounds containing

groups. It is also possible to add the components for forming the Schiff's base one after the other.

The reaction according to the invention may be carried out either in bulk or in the presence of solvents or diluents. Suitable solvents include, for example, hydrocarbons such as petroleum ether, petrol, benzene, toluene, cyclohexane, esters such as ethyl acetate, methyl glycol ether acetate and butyl acetate, carbonamides such as formamide, dimethyl sulfamide, dimethylacetamide or N-methylpyrrolidone, nitriles, such as acetonitrile or benzonitrile, ethers such as diethylether, diphenylether or ethylene glycol dimethyl ether, ketones such as acetone or diethylketone, alcohols and phenols such as methanol, ethanol, butanol, chloroethanol, phenol or cresol. When carrying out the reaction, the polyazomethine may be placed in the reaction vessel and the compound containing the

groups may be added to it or the reverse procedure may be adopted. The reaction in most cases proceeds exothermally and may be carried out at temperatures between −20° and +250° C., preferably at 20 to 150° C.

Catalysts are usually not necessary for the reaction, although alkaline catalysts such as tertiary amines, alkali metal hydroxides such as sodium hydroxide or alkali metal alcoholates sodium methylate may be added to accelerate the reaction, especially where sluggish reactants are being used, such as sterically hindered polyazomethines.

The reactants may also be reacted in the presence of additives which do not take part in the reaction, such as fillers, dyestuffs, optical brightening agents or foam forming agents, such as chlorofluoroalkanes, such as dichlorodifluoromethane, methyline chlorides, and the like. The reaction may, if desired, be carried out in conjunction with a forming process.

When employing polyurethanes containing

groups as a starting material for the reaction with polyazomethines by the process according to the invention the reaction can be carried out by various methods. For example, the linear condensation and/or polymerization products which contain hydroxyl groups and have a molecular weight above 1000 can be reacted with an excess, based on the terminal groups, of an organic polyisocyanate, and the resulting adducts which contain free —NCO groups can be reacted in such a manner with a compound containing two reactive hydrogen atoms and having a molecular weight below 1000 that the isocyanate groups are almost completely used up; in this process, a slight excess of reactive hydrogen atoms may be desirable. Alternatively, the condensation and/or polymerization products which contain hydroxyl groups and have a molecular weight about 1000 can be mixed with the compounds which contain two reactive hydrogen atoms and have a molecular weight below 1000, and a quantity of diisocyanate equivalent to the sum of the reactive hydrogen atoms present may be added although an excess or a less than equivalent amount of the diisocyanate may be employed, if desired. According to another method, the condensation and/or polymerization products which contain hydroxyl groups and have a molecular weight above 1000 can simply be reacted with the equivalent quantity of a diisocyanate, but here again the diisocyanate may be used in slight excess or in slightly less than the equivalent amount. Lastly, compounds containing at least two hydroxyl groups in the molecule and having molecular weights below 1000 can be reacted with equivalent, less than equivalent or greater than equivalent quantities of polyisocyanates to form polyurethanes. In all these cases, care is to be taken to ensure that a polyhydroxy compound having a molecular weight above 1000 and/or a compound having at least two reactive hydrogen atoms and a molecular weight below 1000 is used which contains the group of the formula

which has been more closely defined, at least once in the molecule. The reaction products obtained are linear or branched polyurethanes. They are not cross-linked and are therefore soluble in many solvents such as methyl glycol ether acetate, dimethylformamide, N-methylpyrrolidone or cresol. In the undiluted state, these products are viscous oils or more or less hard, thermoplastic materials.

The high molecular weight reaction products are more or less viscous oils, soft or hard, soluble or cross-linked thermoplastic or non-melting synthetic resins, depending on the type and proportions of the reactants. They may be used as such for a wide variety of applications, for example for lacquers, adhesives or coatings and as casting resins, moulding compositions, foam plastics, fibers or as intermediate products for their production. They can be stored and are resistant to moisture.

As already mentioned earlier, the products of the process constitute polyaddition products which contain phosphorus and nitrogen atoms as chain members. Since the nitrogen atoms are present as secondary amino groups, the products of the process are generally compounds which contain a larger number of highly reactive amino groups in the molecular chain. They can therefore be further modified in many different ways. Of special interest is the modification of the linear or branched noncross-linked products of the process.

The reaction of monoepoxide such as ethylene oxide, propylene oxide or epichlorohydrin on the polyaddition products, which contain secondary amino groups, obtained according to the invention is carried out e.g. in bulk or in solution at −20° C. to 150° C., if desired in the presence of alkaline catalysts. In this reaction, the hydrogen atoms on the secondary amino groups are replaced by beta-hydroxyalkyl group. The polyhydroxyl compounds obtained by this method are particularly suitable as starting materials for the preparation of polyurethane foam plastics.

In addition, the polyaddition products obtained according to the invention react through their secondary amino groups, in bulk or in solution at 20 to 180° C., with organic monoisocyanates, urea groups being formed by this reaction, or with unsaturated compounds such as acrylonitrile to form, for example, N-cyano ethyl groups, or with carboxylic acid esters or anhydrides to form carbonamide groups. By the simultaneous action of lower dialkylphosphites such as diethyl phosphite and carbonyl compounds such as formaldehyde, acetone or benzaldehyde, the secondary amino groups are converted into alpha-amino-alkyl phosphonic acid dialkylester groups by the known alpha-amino-alkylation reaction. The noncross-linked compounds modified in this way are particularly suitable as flame protective agents for plastics and textiles and as plasticizers, e.g. for polyvinyl chloride.

The various modifying reactions of the above mentioned type not only enable new types of linear or branched, noncross-linked products having the above mentioned possible technical applications to be prepared but also constitute an interesting method for the conversion of linear or branched, noncross-linked products into cross-linked synthetic resins.

It is thus possible to link the polyaddition process according to the invention with a second process stage by which noncross-linked polyaddition products can be converted into cross-linked synthetic resins. In this second process stage, the high molecular weight polyaddition products containing secondary amino groups are reacted in bulk or in solution at temperatures between −20° C. and +250° C. preferably 20 to 150° C. with polyisocyanates, polycarboxylic acid anhydrides, esters or chlorides, polyepoxides or formaldehyde or substances giving off formaldehyde, the reaction being accompanied by shaping or forming of the product.

The following are examples of suitable organic polyisocyanates which may be used in the cross-linking reaction: hexamethylenediisocyanate, 1,4-cyclohexanediisocyanate, 1,4-phenylenediisocyanate, 2,4- and 2,6-toluylene diisocyanate, 1,5-naphthylenediisocyanate, 4,4'-diphenylmethane diisocyanate, 4,4',4''-triphenylmethane triisocyanate, 4,4',4'' - triphenylthiophosphate triisocyanate, dimerized or trimerized 2,4-toluylene diisocyanate; urethanes which contain two or more isocyanate groups and which are obtained from the above mentioned polyisocyanates and hydroxyl compounds such as ethylene glycol, 1,4-butanediol, trimethylolpropane or pentaerythritol, and in addition, aryl urethanes which are known as masked isocyanates and which are derived from these isocyanates and preadducts of high molecular weight polyhydroxyl compounds and polyisocyanates, which preadducts contain —NCO end groups. The cross-linking of the polyaddition products of the first process stage with the aid of these polyisocyanates or polyisocyanate splitters proceeds via a reaction of the secondary amino groups with formation of urea bridges. Depending on the desired properties, especially the degree of cross-linking of the end product, the polyisocyanates may be reacted in equivalent, subequivalent or more than equivalent quantities based on the secondary amino groups present in the polyaddition product. Depending on the type and quantity of polyaddition product and polyisocyanate put into the reaction, hard or soft elastic materials are obtained which can be used for coatings, foils, films, moulding compositions and the like. If the reaction is in addition carried out in the presence of water and/or inert blowing agents such as fluorochloromethanes, hard foam plastics are obtained.

Polycarboxylic acid anhydrides, esters or chlorides suitable for the cross-linking reaction include, for example, phthalic acid anhydride, succinic acid anhydride, maleic acid anhydride, pyromellitic acid anhydride, oxalic acid diethyl ester, terephthalic acid dichloride or diethyl carbonate. Cross-linking of the polyaddition products of the first stage of the process with the aid of these polycarboxylic acid derivatives proceeds via conversion of the secondary amino groups into carbonamide groups. The polycarboxylic acid derivatives can also be used in either stoichiometric quantity or in smaller or larger quantities, based on the secondary amino groups originally present.

The action of polyepoxides such as diphenylolpropane-bis-2,3-epoxypropyl ether, 1,4-butanediol-bis-2,3-epoxypropyl ether, bis-2,3-epoxypropyl aniline or higher molecular weight resins from these polyepoxides or of formaldehyde or agents giving off formaldehyde, e.g. urotropin, on the polyaddition products obtained in the first stage of the process leads, under the conditions mentioned above, to cross-linked synthetic resins which can be used as coverings, foils, moulding materials, insulating materials or coating materials.

Since the above mentioned cross-linking agents such as polyisocyanates, polyepoxides, polycarboxylic acid anhydrides or formaldehyde are not capable of reacting under normal conditions, i.e. at temperatures of up to 150° C. and in the absence of catalysts, with the compounds containing at least two

groups in the molecule, which are used as starting materials in the first stage of the process, one particular method of carrying out the process of the invention consists in including the cross-linking agent in the process at the stage of the polyaddition reaction, in the form of a mixture with the compound containing at least two

groups, and adding the polyazomethine thereto or alternatively adding the mixture to the polyazomethine. The secondary amino groups formed in the course of the polyaddition reaction can then react in situ with the cross-linking agents present. By this procedure, which should be carried out in conjunction with a forming process, the cross-linked synthetic resins are obtained directly.

Finally, it should be pointed out that noncross-linked polyaddition products containing secondary amino groups can in many cases be converted into cross-linked synthetic resins by purely thermal means, i.e. by prolonged heating to temperatures of 100 to 250° C.

In accordance with a preferred embodiment of the invention the cross-linking reaction takes place with a quanitative proportion of a polyurethane which contains the

group and a polyazomethine. This cross-linking of the linear or branched polyurethane may be carried out in bulk, e.g. by mixing the polyazomethine into the thermoplastic polyurethane on a rubber mixing roller, at room temperature. Fillers such as carbon black or colloidal silicic acid or lubricants such as stearic acid may be incorporated at the same time. Cross-linking then proceeds after or simultaneously with a forming operation using the vulcanization conditions usual in the rubber industry at temperatures of about 100° C. or more. If the linear or branched polyurethane is present in solution, as, for example, is customary for the production of lacquers and coating materials, the polyazomethine can be mixed either in bulk or as a solution with the solution of the polyurethane, and lacquer coatings can then be applied from this mixture. Depending on the concentration of the

groups in the polyurethane and the reactivity of the polyazomethine, the lacquer solutions may dry even at room temperature, undergoing cross-linking, or only harden when stoved at temperatures of 80 to 180° C. To produce pourable polymethane molding compositions, the molten polyurethane can be mixed hot with the polyazomethine, the mixture poured into suitable molds and the molded articles hardened at elevated temperature. To produce press molded polyurethane articles, the polyurethane is mixed with relatively large quantities of fillers such as sawdust, chalk, carbon black or colloidal silicic acid and a polyazomethine and the mixture formed by pressure molding at elevated temperature. If desired, for cross-linking the polyurethane, polyisocyanates such, for example, as dimerized or trimerized toluylene-2,4-diisocyanate may be used in addition to the polyazomethine which is used according to the invention. Depending on the choice of starting materials and reaction conditions, high grade polyurethane rubbery elastic materials, coatings, films, foils, compression molded articles, adhesive bondings, textile coatings and the like can be obtained by the process of the invention. The cross-links between the polyurethane chains, which are brought about by phosphorus-carbon bonds according to the following idealized scheme or formulas are themally very stable, with the result that the products of the process are distinguished by high heat resistance.

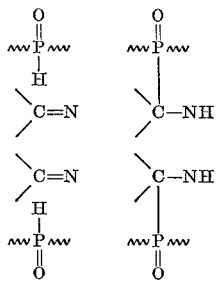

All the synthetic resins or synthetic resin intermediate products obtainable by the process according to the invention are endowed by virtue of their phosphorus content with the particular advantage of flame-resistance or incombustibility which is of interest for many applications in the plastics field.

The invention is further illustrated by the following examples in which parts are by weight unless otherwise specified.

EXAMPLE 1

(a) Preparation of the starting material

A mixture of about 247 grams di-(beta-chloroethyl)-phosphite and about 70.5 grams 1,6-hexanediol is heated in vacuo to about 100 to 130° C. about 106 grams ethylene chlorohydrin distill off in the process. About 200 grams of the bis-dialkylphosphite of the following formula:

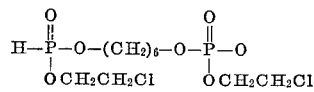

remain in the residue in the form of a colorless oil.

(b) Process according to the invention

About 37.1 grams of the starting material are mixed with 29.2 grams of the di-Schiff's base of about 2 mols benzaldehyde and about 1 mol hexamethylenediamine. The mixture is heated for about 2 hours at about 100° C. A viscous, yellow resin is obtained which is soluble in dimethylformamide.

Approximately a 50% solution of the resin in dimethylformamide is spread over a glass plate and dried for about 12 hours at about 100° C. The resulting lacquer is clear and pale yellow. It is insoluble in all organic solvents.

EXAMPLE 2

(a) Preparation of the starting material

A mixture of about 236 grams 1,6-hexanediol and about 607 grams diethyl phosphite is heated to about 130 to 150° C. Ethanol distils off. Condensation is completed in vacuo to remove excess diethyl phosphite. About 600 grams of a colorless oil of the formula

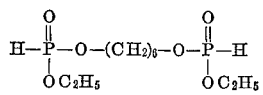

remains in the residue.

(b) Process according to the invention

About 3.02 grams of the starting material are mixed with about 2.92 grams of the di-Schiff's base of Example 1(b). The mixture is heated for about 2 hours at about 130° C. and then cooled. The reaction product is a viscous, pale yellow oil. The oil is dissolved in about 15 ml. dimethylformamide and the solution mixed with about 1.68 grams of hexamethylene diisocyanate at about 20° C. A film of the mixture is spread onto a glass surface. The film hardens at room temperature in the course of about 1 to 2 hours, it can easily be detached from the glass and is colorless, elastic and not friable.

EXAMPLE 3

A reaction product obtained according to Example 2(b) from about 3.02 grams of the starting material and about 2.92 grams of the di-Schiff's base is dissolved in about 10 ml. ethyl acetate and mixed with about 1.48 grams phthalic acid anhydride. The solution is spread onto a glass plate. A cross-linked, soft, colorless film is obtained after about 2 to 3 days at about 20° C.

EXAMPLE 4

A reaction product obtained according to Example 2(b) from about 3.02 grams of the starting material and about 2.92 grams of the di-Schiff's base is dissolved in about 15 ml. dimethylformamide and mixed with about 3.4 grams diphenylolpropane-bis-(2,3-epoxypropyl ether). The mixture is spread onto a glass plate which is then kept for about 12 hours at about 100° C. This treatment results in a colorless, very hard and completely scratch-resistant lacquer film which has a high surface gloss and very good adhesion to glass.

EXAMPLE 5

About 30.2 grams of the starting material of Example 2(a) are mixed with about 22.4 grams of the di-Schiff's base of about 2 mols isobutyraldehyde and about 1 mol hexamethylene diamine at room temperature, when an exothermic reaction takes place. The mixture is then heated for about 2 hours at about 130° C. The resulting yellow resin is dissolved in about 52.6 grams ethyl acetate. Into separate about 10.52 grams portions of this solution are stirred, at about 20° C., (a) 1.68 grams hexamethylene diisocyanate and (b) 1.74 grams toluylene diisocyanate. Films of these modified solutions are spread onto glass and dried for about 12 hours at about 20° C. At the end of this time, both the film formed from (a) and that formed from (b) are cross-linked. Both films are colorless and scratch resistant and have a glassy surface.

EXAMPLE 6

About 10.52 grams of the solution of polyaddition product in ethyl acetate obtained according to Example 5 are treated with about 3.4 grams diphenylolpropane-bis-(2,3-epoxypropyl ether). Films of this solution are applied onto glass plates and dried for about 12 hours at about 100° C. An elastic, scratch-resistant lacquer of pale yellow color, high gloss and very good adhesion to glass is obtained.

EXAMPLE 7

About 30.2 grams of the starting material from Example 2(a) are mixed with about 37.4 grams of the di-Schiff's base of about 2 mols benzaldehyde and about 1 mol 4,4'-diaminodiphenylmethane in about 50 ml. of dimethylformamide. The mixture is heated for about one hour at about 70° C., a clear solution being formed. From a sample of this solution, a film (film A) is spread onto glass and dried for about 12 hours at about 100° C. In a second test, about 3.4 grams diphenylolpropane-bis-(2,3-epoxypropylether) are added to about 11 grams of the solution and a film (film B) is again spread onto a glass plate which is then kept for about 12 hours at about 100° C.

After hardening, both films A and B are insoluble in boiling dimethylformamide. Film A is hard, scratch-resistant and yellow but has a certain brittleness. Film B is colorless, scratch-resistant and elastic.

EXAMPLE 8

(a) Preparation of the starting material

A mixture of about 960 grams of a polypropyleneglycol (molecular weight about 1000) and about 397 grams di-(beta-chloroethyl)phosphite is condensed for about 7 hours at about 130 to 140° C. in vacuo. About 162 grams ethylene chlorohydrin are split off and a colorless oil of molecular weight about 120 ($n_D^{20}=1.4568$) is obtained.

(b) Process according to the invention

About 25.1 grams of the phosphorus compound prepared according to Example 8(a) are mixed with about 5.85 grams of the di-Schiff's base of about 2 mols benzaldehyde and about 1 mol 4,4'-diamino-diphenylmethane in about 50 ml. dimethylformamide. The mixture is heated for about 3 hours at about 130° C. and then treated with about 7.0 grams of a mixture of 80% 2,4- and 20% 2,6-toluylene diisocyanate. A film is spread from this solution on a glass plate and dried for about 12 hours at about 50° C. The resulting film is cross-linked, does not stick and has a yellow color.

EXAMPLE 9

About 15 grams of the starting material from Example 2(a) and about 9.2 grams of a mixture of 80% 2,4- and 20% 2,6-toluylene diisocyanate are dissolved in about 25 ml. dimethylformamide. About 7.3 grams of the di-Schiff's base of Example 1(b) are added to this solution at about 100° C. A glass plate is coated with this solution. After about 12 hours drying at about 100° C., an elastic, scratch resistant, colorless lacquer is obtained which adheres very firmly to the glass surface.

EXAMPLE 10

(a) Preparation of the starting material

A mixture of about 316 grams diphenylolpropane-di-(beta-hydroxyethylether) and about 304 grams diethylphosphite is condensed at about 130 to 150° C., for about 14 hours, ethanol being split off in the process. Condensation is completed in vacuo to remove excess diethylphosphite. About 483 grams of a yellow, clear oil remain in the residue ($n_D^{20}=1.5350$).

(b) Process according to the invention

About 12.5 grams of the starting material are mixed with about 11.2 grams of the di-Schiff's base of Example 5. The mixture is heated to about 50° C., an exothermic reaction setting in and the temperature rising to about 110° C. In the course of about 2 minutes at about 110° C. the polyaddition product which is initially resinous, is converted into a cross-linked rubbery elastic mass.

EXAMPLE 11

(a) Preparation of the starting material

About 50 grams of a linear polyester of adipic acid and ethylene glycol of molecular weight of about 2000 and —OH number of about 56 are dissolved in about 100 ml. of dimethylformamide. To this solution are added about 47.6 grams of diphenylmethane-4,4'-diisocyanate at about 100° C., and the mixture is then heated for about 30 minutes at about 130 to 140° C. It is then cooled to about 100° C. and there are added about 50 grams of di-(6-hydroxyhexyl)-phosphite which is prepared by condensing about 1 mol diethylphosphite with about 2 mols ethanol. When the exothermic reaction has died down, the solution is heated for approximately another 30 minutes at about 130° C. and a sample of this solution is then painted on a glass plate to form a film (film A).

(b) Process according to the invention

About 24.8 grams of the di-Schiff's base of about 2 mols benzaldehyde and about 1 mol hexamethylenediamine are introduced at about 100° C. into the clear, colorless polyurethane solution prepared according to Example 11(a), and a sample of the solution thus obtained is painted on a glass plate (film B). The glass plate with films A and B are dried for about 12 hours at about 100° C. After this treatment, film A obtained from the starting material still has a sticky, honey-like consistency and dissolves readily and completely in cold dimethylformamide whereas film B obtained by the process according to the invention has hardened to a completely non-sticky material which is clear, elastic and insoluble in dimethylformamide. The polyurethane solution left after film B has been painted swells after about 3 hours storage at room temperature, which shows that cross-linking of the polyurethane with the di-Schiff's base also proceeds at room temperature.

EXAMPLE 12

(a) Preparation of the starting material

About 100 grams of a linear polyester of adipic acid and ethylene glycol (molecular weight about 2000, —OH number about 56) are dissolved in about 100 ml. dimethylformamide and reacted at about 100° C. with about 33.5 grams diphenylmethane - 4,4' - diisocyanate.

About 28.2 grams of di-(6-hydroxyhexyl)-phosphite are then added and the solution then heated for another hour at about 100° C.

(b) Process according to the invention

About 14.6 grams of the di-Schiff's base of Example 1(b) are added at about 100° C. to the solution prepared according to Example 12(a) and the resulting solution is painted onto a glass plate. The glass plate is heated for about 12 hours at about 100° C. At the end of this treatment, the polyurethane film is clear, elastic and insoluble in dimethylformamide. The film has high surface glass and remarkably firm adhesion to the glass surface.

EXAMPLE 13

(a) Preparation of the starting material

The procedure is exactly like Example 12(a) except that about 22.5 grams hexamethylenediisocyanate are used instead of 33.5 grams diphenylmethane-4,4'-diisocyanate.

(b) Process according to the invention

The solution prepared according to Example 13(a) is reacted in the manner described in Example 2(b) with about 14.6 grams of the di-Schiff's base of Example 1(b) and a film of this solution is painted onto a glass plate. After about 12 hours hardening at about 100° C., an elastic soft, colorless film is obtained which is no longer soluble in boiling dimethylformamide.

EXAMPLE 14

(a) Preparation of the starting material

About 50 grams of a linear polypropylene ether glycol (molecular weight about 2000, OH number about 56) are dissolved in about 100 ml. of ethylene glycol monomethylether acetate and reacted with about 47.6 grams of diphenylmethane-4,4'-diisocyanate at about 130° C. About 50 grams di-(6-hydroxyhexyl)-phosphite are then added at about 100° C., the mixture is then heated for approximately another 30 minutes at about 130° C. and finally a sample of the resulting milky turbid solution is painted onto glass (film A).

(b) Process according to the invention

About 24.8 grams of the di-Schiff's base of Example 1(b) are added at about 100° C. to the solution prepared according to Example 14(a) and a film is painted onto a glass plate (film B). The two glass plates with films A and B are heated for about 10 hours at about 100° C. After this treatment, the film A made from the starting material has a turbid, cheesy consistency and is readily soluble in dimethylformamide whereas film B which has been cross-linked according to the invention is soft and colorless and has a glossy surface.

EXAMPLE 15

(a) Preparation of the starting material

A mixture of about 207 grams of di-(beta-chloroethyl)-phosphite and about 125 grams of 1,6-hexanediol is condensed in a partial vacuum at about 130° C. About 147 grams of ethylene chlorohydrin are distilled off over a bridge in the course of about 5 hours at about 130° C. Condensation is continued at about 150° C. in a partial vacuum until the calculated quantity (about 161 grams) of ethylene chlorohydrin has been split off. The condensation product (about 170 grams) is a linear polyester of phosphorous acid (molecular weight about 2100; OH number about 54). About 20 grams of this polyester are dissolved in about 20 ml. dimethylformamide. About 2.4 grams diphenylmethane-4,4'-diisocyanate are added to this solution at about 120° C. and the reaction mixture then heated for approximately a further 30 minutes at about 130° C., and a film is then made from a sample of this solution on a glass support (film A).

(b) Process according to the invention

About 16 grams of the di-Schiff's base of Example 1(b) are added at room temperature to the polyurethane solution prepared according to Example 15(a), and a film is immediately painted onto a glass plate. The remaining polyurethane solution undergoes cross-linking even after only a few minutes to form a gelatinous mass. The two films A and B are heated for about 6 hours at about 100° C. At the end of this treatment, film A obtained from the starting material has a honey-like consistency and is cloudy while film B which has been cross-linked according to the invention is clear, scratch-resistant and very hard. Film B has a glossy surface and adheres very firmly to the glass support.

EXAMPLE 16

(a) Preparation of the starting material

A mixture of about 750 grams triethylene glycol and about 828 grams dichloroethyl phosphite is heated to about 120 to 140° C. under reduced pressure. About 628 grams ethylene chlorohydrin are split off in the course of 8 hours. About 950 grams of a colorless, oily polyester (OH number about 132) remain behind in the residue.

About 11.4 grams hexamethylenediisocyanate are added to about 55 grams of this polyester at about 120° C. The viscous; colorless reaction product is then disolved in 50 ml. dimethylformamide and a film is made from a sample of this solution on a glass support (film A).

(b) Process according to the invention

About 19 grams of the di-Schiff's base of Example 1(b) are added at about 100° C. to the polyurethane solution prepared according to Example 16(a), and a film of this solution is then painted on a glass plate (film B). The two glass plates with films A and B are kept at about 110° C. for about 12 hours. At the end of this time, film A prepared from the starting material is still liquid, cloudy and not cross-linked whereas film B, although soft, is elastic and clear and insoluble in dimethylformamide.

EXAMPLE 17

(a) Preparation of the starting material

By a procedure analogous to that described in Example 6(a), a linear polyester (OH number about 151) is prepared from about 590 grams 1,6-hexanediol and about 828 grams di-beta-chloroethylphosphite.

About 22 grams diphenylmethane-4,4'-disocyanate are added at about 100° C. to a solution of about 50 grams of this polyester and about 50 grams of a linear polypropylene glycol (molecular weight about 2000; OH number about 54) in about 100 ml. dimethylformamide and the reaction mixture is then heated for about one hour at about 130° C.

(b) Process according to the invention

About 19 g. of the di-Schiff's base of Example 1(b) are added at about 20° C. to the colorless polyethane solution prepared according to Example 17(a), and a sample of the solution is then spread over a smooth wooden plate. The plate is dried for about 10 hours at about 100° C. At the end of this time the lacquer film is completely cross-linked. It is scratch-resistant, colorless, clear and a high gloss. The modified polyurethane solution remaining behind after application of the film keeps unchanged for about 2–3 days at room temperature; at the end of that time, the polyurethane slowly cross-links in solution to form a colorless, gelationous mass.

EXAMPLE 18

(a) Preparation of the starting material

About 50 grams of the phosphite polyester (OM number about 151) prepared according to Example 7(a)

together with about 50 grams of a polyester (molecular weight about 2000; OH number about 56) prepared from adipic acid and ethylene glycol are dissolved in about 100 ml. dimethylformamide. About 15.5 grams of a mixture of 65% toluylene-2,4-diisocyanate and 35% toluylene-2,6-diisocyanate are added to this solution at about 100° C. When the exothermic reaction has subsided the solution is heated for about one hour at about 130° C. From a sample of this solution, a film is spread onto a glass plate (film A).

(b) Process according to the invention

The polyurethane solution prepared according to Example 18(a) is divided into two approximately equal parts. About 19 grams of the di-Schiff's base of Example 1(b) are stirred into one part and a film is painted on a glass plate (film B). About 9.5 grams of the same di-Schiff's base is stirred into the other part of the solution and a film (film C) is made in an analogous manner. Flms A, B and C are heated for about 12 hours at about 100° C. At the end of that time, film A still has a sticky, honey-like consistency, film B is soft, elastic and glossy and film C is elastic but not completely free from stickiness.

EXAMPLE 19

(a) Preparation of the starting material

A polyurethane solution is prepared as in Example 8(a) except that about 15.0 grams hexamethylene diisocyanate are used instead of 15.5 grams of the mixture of toluylene diisocyanates.

(b) Process according to the invention

About 14.5 grams of the di-Schiff's base of about 2 mols of isobutylroaldehyde and about 1 mol of hexamethylenediamine are added at about 25° C. to the polyurethane solution prepared according to Example 19(a), and a film of this solution is then painted onto a polished copper plate. The plate is heated for about 12 hours at about 120° C. The cross-linked film is clear, non-sticky and elastic and has a pale yellow color.

EXAMPLE 20

(a) Preparation of the starting material

About 33.8 grams diphenylmethane-4,4'-diisocyanate are added at about 130° C. to a solution in about 100 ml. dimethylformamide of about 100 grams of the polyester (OH number about 151) prepared according to Example 7(a), and the solution is then stirred for about 3 hours at about 120° C.

(b) Process according to the invention

The solution prepared according to Example 20(a) is divided into two approximately equal parts. About 38 grams of the di-Schiff's base of Example 1(b) are added to one of the parts, and a film is painted on a glass plate (film A). The other part of the solution is mixed with about 19 grams of the same di-Schiff's base and a film (film B) is painted on a glass plate. The two films are heated for about 12 hours at about 100° C., and both films are then hard, scratch-resistant, elastic and glossy.

EXAMPLE 21

(a) Preparation of starting material

The procedure is the same as in Example 10(a) except that about 22.7 grams hexamethylene diisocyanate are used instead of 33.8 grams diphenylmethane-4,4'-diisocyanate.

(b) Process according to the invention

The polyurethane solution obtained according to Example 21(a) is mixed with about 38 grams of the di-Schiff's base of Example 1(b) at about 100° C. A film is cast on to a glass plate with a sample of the solution. After about 12 hours drying at about 100° C. the resulting film is clear, elastic and scratch resistant and is remarkable for its extraordinarily film adhesion to the glass surface.

EXAMPLE 22

(a) Preparation of the starting material

About 50 grams of a linear polyester of adipic acid and ethylene glycol (molecular weight about 2000; OH number about 56) are dissolved in about 100 ml. dimethylformamide and reacted with about 32 grams hexamethylene diisocyanate at about 130° C. The reaction is allowed to proceed for about 30 minutes at about 130° C. and about 50 grams di-(6-hydroxyhexyl)-phosphite are then added and the solution then heated for approximately an additional one hour at about 130° C.

(b) Process according to the invention

The polyurethane solution obtained according to Example 22(a) is mixed at room temperature with about 19 grams of the di-Schiff's base of Example 9(b). From this modified solution, films are poured onto glass plates and dried for about 8 hours at about 100° C. After this treatment, the films are clear, elastic and insoluble in dimethylformamide.

EXAMPLE 23

(a) Preparation of the starting material

About 50 grams of the polyester (OH number about 151) prepared according to Example 7(a) are dissolved in about 50 ml. dimethylformamide. About 14.2 grams naphthylene-1,5-diisocyanate are stirred into the solution at about 130° C. and the solution is kept at a temperature of about 130° C. for about one hour.

(b) Process according to the invention

About 38 grams of the di-Schiff's base of Example 1(b) are added at about 100° C. to the solution obtained according to Example 23(a), and a film is painted on a glass plate. After about 6 hours drying at about 100° C. an opaque, pale yellow film is obtained which is extraordinarily hard and scratch-resistant.

EXAMPLE 24

(a) Preparation of the starting material

A mixture of about 414 grams dichloroethylphosphite and about 790 grams diphenylolpropane-di-(beta-hydroxyethylether) is condensed in vacuo, first at about 140° C. and finally at about 160° C. until all the ethylene chlorohydrin has been split off. About 880 grams of a yellow, clear, highly viscous resin remain in the residue.

About 52.8 grams of this polyester are dissolved in about 50 ml dimethylformamide and reacted at about 130° C. with about 5 grams of hexamethylene diisocyanate. The resulting yellow, clear oil is divided into three approximately equal parts.

(b) Process according to the invention

The polyurethane solutions obtained according to Example 24(a) are treated at about 20° C. with about 8 grams of the di-Schiff's base of Example 19(b), about 10 grams of the di-Schiff's base of Example 1(b) and about 14 grams of the di-Schaff's base of about 1 mol of benzaldehyde and 1 mol of 4,4'-diaminodiphenylmethane respectively. As in Example 18(b) films A, B and C are made from the modified solutions and dried at about 100° C. for about 12 hours. All the films obtained are hard and scratch resistant. Films A and C are yellow, film B is colorless.

EXAMPLE 25

(a) Preparation of the starting material

The procedure is the same as in Example 14(a) except that about 2 grams of naphthylene-1,5-diisocyanate are used instead of 5 grams of hexamethylenediisocyanate.

(b) Process according to the invention

The solution obtained according to Example 25(a) is divided into three approximately equal parts which are treated, respectively, with the mixture di-Schiff's bases mentioned in Example 14(b). The films obtained are hardened for about 12 hours at about 100° C. and are then non-sticky, scratch-resistant and opaque.

EXAMPLE 26

(a) Preparation of the starting material

About 628 grams N,N-di-(beta-hydroxyethyl)-aminomethylphosphonic acid diethyl ester are condensed with about 414 grams dichloroethyl phosphite at about 110 to 130° C. in vacuo. Ethylene chlorohydrin is split off and highly viscous, resinous, linear polyester, molecular weight about 14,000 is formed. Yield about 740 grams.

About 43.8 grams of this polyester are dissolved in about 50 ml. dimethylformamide. The solution is treated with about 7.5 grams diphenylmethane-4,4'-diisocyanate and stirred for about one hour at about 130° C.

(b) Process according to the invention

About 30 grams of the di-Schiff's base of about one mol of benzaldehyde and about one mol of 4,4'-diaminodiphenylmethane are added to the polyurethane solution prepared according to Example 26(a), and films are painted on wood and on glass. The films are dried for about 12 hours at about 100° C. and are then hard and scratch-resistant. They are brown in color and insoluble in dimethylformamide.

It is to be understood that the foregoing examples are given for the purpose of illustration and that any other suitable compound containing a plurality of

groups or any other suitable compound containing a plurality of azomethine groups may be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Polyaddition polymers prepared by a process which comprises reacting a compound having a plurality of

groups linked together by organic residues with a compound having a plurality of azomethine groups at a temperature of from about −20° C. to about 250° C.

2. The polyaddition polymer of claim 1 wherein said compound having a plurality of

groups is a polyurethane.

3. The polyaddition polymer of claim 1 wherein said compound containing a plurality of azomethine groups is the reaction product of an organic diamine and an aldehyde.

4. The polyaddition polymer of claim 1 wherein said compound having a plurality of

groups is a bis-dialkylphosphite and said compound containing a plurality of azomethine groups is the di-Schiff's base of benzaldehyde and hexamethylene diamine.

5. The polyaddition polymer of claim 1 wherein said compound having a plurality of

groups is a polyurethane prepared by a process which comprises reacting an organic polyisocyanate with a polyol based on a compound having a plurality of

groups.

6. A process for the production of high molecular weight polyaddition polymers containing phosphorus and nitrogen atoms as chain members which comprises reacting a compound containing a plurality of

groups linked together by organic residues at a temperature of about −20° C. to about 250° C. with a compound containing at least two azomethine groups.

7. The process of claim 6 wherein cross-linked polyadition polymers are prepared by a process which comprises reacting the compound containing a plurality of

groups and the compound containing at least two azomethine groups in the presence of an organic polyisocyanate, polyepoxide, polycarboxylic acid, polycarboxylic acid anhydride, polycarboxylic acid ester, polycarboxylic acid chloride or formaldehyde to produce a cross-linked product.

8. A process for the preparation of high molecular weight, cross-linked polyurethane plastics which comprises reacting linear or branched polyurethanes which have been prepared by the isocyanate polyaddition process from polyhydroxyl compounds and polyisocyanates and which contain, incorporated in the molecule, two or more

groups in which the phosphorus atom is linked to a carbon atom directly or through an oxygen or a nitrogen atom, at temperatures of about −20° C. to about 250° C. with compounds which contain at least two azomethine groups in the molecule.

9. Process according to claim 8 characterized in that the compound which contains at least two azomethine groups in the molecule is produced from aldehydes or ketones and polyamines or from polyaldehydes and monoamines or polyamines in the reaction mixture.

References Cited

UNITED STATES PATENTS 2,847,442   8/1958   Sallmann _____ 260—970

FOREIGN PATENTS 1,190,186   1/1965   Germany.

WILLIAM SHORT, Primary Examiner

T. E. PERTILLA, Assistant Examiner

U.S. Cl. X.R.

117—124; 260—2, 2.5, 59, 65, 67, 67.6, 72, 75, 77.5, 78.4, 927, 928, 929, 930